US009516513B2

(12) United States Patent
Sægrov et al.

(10) Patent No.: US 9,516,513 B2
(45) Date of Patent: Dec. 6, 2016

(54) METHOD AND SYSTEM FOR LONG-RANGE ADAPTIVE MOBILE BEAM-FORMING AD-HOC COMMUNICATION SYSTEM WITH INTEGRATED POSITIONING

(75) Inventors: Atle Sægrov, Trondheim (NO); Roger Kamben, Trondheim (NO)

(73) Assignee: Radionor Communications AS, Trondheim (NO)

( * ) Notice: Subject to any disclaimer, the term of this patent is extended or adjusted under 35 U.S.C. 154(b) by 134 days.

(21) Appl. No.: 14/116,827

(22) PCT Filed: May 16, 2012

(86) PCT No.: PCT/NO2012/050090
§ 371 (c)(1),
(2), (4) Date: Nov. 11, 2013

(87) PCT Pub. No.: WO2012/158045
PCT Pub. Date: Nov. 22, 2012

(65) Prior Publication Data
US 2014/0105054 A1    Apr. 17, 2014

(30) Foreign Application Priority Data
May 16, 2011    (NO) .................................... 20110728

(51) Int. Cl.
*G01R 31/08*    (2006.01)
*G06F 11/00*    (2006.01)
(Continued)

(52) U.S. Cl.
CPC ............ *H04W 16/28* (2013.01); *G01S 5/0072* (2013.01); *G01S 5/12* (2013.01); *H01Q 3/2605* (2013.01);
(Continued)

(58) Field of Classification Search
CPC .................................. G01S 5/12; G01S 5/0072
See application file for complete search history.

(56) References Cited

U.S. PATENT DOCUMENTS 6,016,120 A     1/2000   McNabb et al.
6,018,659 A *   1/2000   Ayyagari et al. ............. 455/431
(Continued)

FOREIGN PATENT DOCUMENTS

EP         0837567 A2       4/1998
WO    WO 0143309 A2 *       6/2001   ........... H04B 7/0619
WO        2011002260 A2     1/2011

OTHER PUBLICATIONS

International Search Report and Written Opinion dated Dec. 7, 2012 (PCT/NO2012/050090).
(Continued)

*Primary Examiner* — Maharishi Khirodhar
(74) *Attorney, Agent, or Firm* — Alix, Yale & Ristas, LLP

(57) ABSTRACT

Method and system for provided a long range, high capacity ad-hoc mobile communication network where a narrow antenna beam formed by a plurality of antenna elements, radio transceivers and digital spatial signal processing is used to provide a high accuracy positioning system integrated into the communication system. The relative positions and directive orientation of all the units in the network is done by mutual exchange of positioning data as an element in the communication protocol in the network.

29 Claims, 10 Drawing Sheets

(51) Int. Cl.
   *H04W 16/28* (2009.01)
   *G01S 5/00* (2006.01)
   *G01S 5/12* (2006.01)
   *H01Q 3/26* (2006.01)
   *H04W 24/08* (2009.01)
   *H04W 64/00* (2009.01)
   *H04W 84/18* (2009.01)
   *G01S 7/00* (2006.01)
   *G01S 7/28* (2006.01)
   *H04B 7/06* (2006.01)

(52) U.S. Cl.
   CPC ............. *H01Q 3/267* (2013.01); *H04W 24/08* (2013.01); *H04W 64/00* (2013.01); *H04W 84/18* (2013.01); *G01S 7/006* (2013.01); *G01S 7/2813* (2013.01); *H04B 7/0617* (2013.01)

(56) References Cited

U.S. PATENT DOCUMENTS

| 2004/0193669 | A1  | 9/2004  | Shirani |
| 2004/0259597 | A1* | 12/2004 | Gothard ................. H01Q 1/241 |
|              |     |         | 455/562.1 |
| 2005/0174950 | A1  | 8/2005  | Ayyagari |
| 2008/0261623 | A1* | 10/2008 | Etemad et al. ............ 455/456.2 |
| 2011/0059755 | A1* | 3/2011  | Kim et al. ................. 455/456.3 |

OTHER PUBLICATIONS

International Preliminary Report on Patentability dated Mar. 15, 2013 (PCT/NO2012/050090).

Shi-Sue, Wei et al., "A Framework Using Fingerprinting for Signal Overlapping-Based Method in WLAN," Computer Symposium (ICS), 2010 International, Piscataway, NJ, USA.

* cited by examiner

METHOD AND SYSTEM FOR LONG-RANGE ADAPTIVE MOBILE BEAM-FORMING AD-HOC COMMUNICATION SYSTEM WITH INTEGRATED POSITIONING

CROSS-REFERENCE TO RELATED APPLICATION

This application is a U.S. National Stage Entry from International Patent Application No. PCT/NO2012/050090 filed on May 16, 2012, which claims priority to Norwegian Patent Application No. 20110728 filed on May 16, 2011.

BACKGROUND (1) Field of Invention

The disclosure relates to a system and method in the field of mobile communication.

(2) Description of Related Art

The disclosure relates to a method of setting up a wireless long range communication network between several units communication units. Also disclosed is a system for setting up a wireless long range communication network with integrated positioning.

The dominating wireless system deployments today are telecom systems optimized for RF bandwidth efficiency and low manufacturing costs for the user terminals. Examples of such systems are conventional digital GSM telecommunication systems and 3G, HSDPA, WiMAX, LTE and other 4G systems for mass distribution of digital bandwidth.

Common for all these systems are that the communication system structures are cell based with a base station acting as a master that controls the traffic in each cell or sector. In the context of RF bandwidth efficiency it is not optimum to combine short rage traffic with long range traffic because the communication parameters are optimized for a given range of time-of-flight, and hence, different cell sizes are combined from pico-cells to macro-cells. For GSM the maximum macro-cell radius is 35 km. In order to re-use the RF frequency resource and increase capacity for mass distribution, smaller cell radius are used, a typical cell radius is 1-5 km.

For 4G systems such as LTE even smaller cells radiuses are defined. To increase bandwidth efficiency multiple antenna elements and MIMO techniques are used, but these techniques increase efficiency only when propagation paths through different reflections can be utilized, and when the channel is not changing rapidly, and hence for short range in reflective environments the MIMO techniques are efficient. The number of MIMO antennas on the base station is limited by processing power and cost-benefit compromises, and the number of antenna elements is typically in the range between 3 and 8. For the client terminal, the available space for antenna elements, available processing power, current consumption and manufacturing cost is limited, and the number of antenna elements is typically in a typical range of 2-3 elements.

For mobile applications at longer ranges, the channel changes rapidly causing large channel dispersion, and hence the efficiency of both MIMO techniques and bandwidth efficiency is severely reduced when the terminal is moving. In rural areas without coverage from cell based systems, satellite systems are used. Examples of satellite systems are VSAT and IRIDIUM. Common for all satellite systems are that all traffic has to be routed through the satellite, and hence, the system is a wireless star topology system where the frequency resources are shared by all user terminals covered by the satellite. The long distance to the satellite leads to a need for highly directive antennas, such as motorized parabolic dishes with gyro stabilization or other compromises like bandwidth reduction, to achieve a stable link for mobile installations.

The satellite systems also suffer from additional atmospheric losses and dispersion effects for terminals close to the poles of the earth, due to the inclination angle is low. The impact of the atmospheric losses and dispersion effects is known to result in partial unstable links.

Another main limitation with satellite systems are the long delays because of the long distance to the satellite. A typical accumulated delay to and from a satellite in geostationary orbit is 240 ms. For applications, such as voice and video conferencing and real-time remote control applications, this delay reduces the quality of service, link efficiency and also excludes real-time applications that requires short latency time in order to operate properly.

Real time regulation systems related to navigation, such as guidance systems for airplanes or missiles, require fast regulation loops. These are implemented as a combination of separate sensor systems and communication systems. Sensor systems for guidance involving GPS have a limited update speed and a limited vertical resolution in some satellite constellations that limits the performance for high speed guiding systems. Satellite positioning services, such as GPS, could also easily be disrupted by jamming transmitters which is a severe limitation of secure operation. Optical systems are fast, precise and difficult to disrupt by jamming, but cannot operate at long distances in unfavorable weather conditions, such as snow, rain and fog.

With prior art combination of different sensor systems and communication systems that must be applied to implement a real-time guidance system for mobile units, this will introduce extra latency and complexity increasing regulation loop delay and reduced stability margins.

GB2448510A discloses a radio frequency communication method, apparatus or system which comprises a first antenna which transmits information regarding its location to a second antenna which receives the said information and uses it to align a directional radiation beam from the second antenna towards the location of the first antenna. The publication describes a lobe-aligning system based on switching antennas between omnidirectional antennas transmitting location information and highly directive antennas which are used for communication purposes. The system requires a secondary radio system which is complex and expensive in addition to a very precise direction sensor system in order to determine the optimum direction for the phased array antenna system. The beam will always be directed towards each other even if direct line-of-sight is blocked and communication could be possible via a reflection of the signal. The speed of the mobile units and number of units in the network are limited by the network capacity of the first antenna system which is transmitting omnidirectional at a relatively low data rate.

WO2010025996 discloses a method for performing communications in a wireless communication network, comprising receiving mobility information about at least one moving mobile station in a mobility server of the wireless communication network, using the mobility information from the mobility server for calculating antenna weights to be applied to antenna elements of an antenna array for steering a beam generated by the antenna array to the moving mobile station. The publication describes an antenna array ground system and a RF transceiver system on the mobile units. The mobility data from the mobile units are communicated through a network to a mobility server which sends the information to the steering vector for the antenna array. The system is complex and if the system has many nodes in the network, the latency of mobility information distribution will be significant. If the RF channel is rapidly changing and the optimum antenna direction is not the direct line-of-sight to the mobile station, the described system will have significant limitations with respect to reliability and range. The publication does not describe a symmetrical array antenna solution for both the ground station and the aircraft, and limits the frequency re-use for the elevated mobile stations that does not incorporate narrow, adaptive antenna beams.

US20030174048 discloses an identification tag with RF circuitry, ultra-wide bandwidth (UWB) circuitry and a method is described for measuring the time-of-flight between the identification tag and a local device. By combining the measured time-of-flight distances between several units and applying triangulation, the relative position of the identification tag can be found. The disclosed publication uses signal processing in the time domain only to determine the time-of-arrival, and hence, the time-of-flight measurement are very sensitive to inaccuracies by delay spread from a RF multipath scenario. If the delay spread is short, the numerous multipath copies of the signal cannot be separated using the disclosed correlation method. The utilization of the disclosed UWB circuitry has other major disadvantages, such as large current consumption, high-speed analog to digital converters with limited dynamic range and because the RF bandwidth is very large, the allowed transmission output power and operative range is very limited.

EP0837567 discloses an airborne broadband communication network. A deployed group of airborne vehicles provide relay communication service among mobile and airborne customers by using a directed phased array antenna. Each airborne vehicle has a wireless link to one or more neighboring airborne vehicles forming an airborne inter-networked mesh constellation for routing traffic between mobile customers. The phased array antenna is implemented by phase delay elements on each antenna element, and hence, the system must have a pre-defined anticipation of the direction of the in-coming signal by other means, such as sensors, for attitude information in order to direct the receiver beam in the right direction before data can be demodulated with maximum gain. For non-line of sight applications this method is not feasible because the direction vary very rapidly. For line of sight applications, the method limits the useable bandwidth if a beam lock is lost, and the receiver needs to re-lock the antenna beam in the receiver.

SUMMARY

Disclosed herein is a method and system which solves the mentioned disadvantages with the prior art.

More specifically, disclosed is a method and system for providing a long range communication network for mobile applications where the offered bandwidth is high, the frequency re-use and network efficiency is high. The communication range is long according to the disclosure as a combination of modulation technique, analog implementation, digital spatial-time signal processing and method of utilization of a highly directive adaptive array symmetrical antenna system. The implementation of a communication controller provides a very high efficiency for both short and long range. The mesh network is organized so no base station is required, and is self-organized so traffic collisions and interference is avoided, and transmission can be done with low latency and jitter.

Also disclosed is a system with a high precision positioning system integrated with the communication system that provide a high positioning accuracy and low latency transfer of the positioning data across the wireless ad-hoc network to the other nodes in the system.

The built-in positioning system may be employed to use the distributed positioning information to increase link efficiency and to apply limitations for power emission according to the constellation of mobile units. The integrated positioning system and dynamic database of interference areas are used together with power emission control and dynamic beam-forming to comply to regulations of maximum power emission in the given geographical location and directional orientation of the radiated antenna beam. In tactical scenarios, power emissions into hazard areas or areas with hostile forces operating can be also be limited accordingly.

The built-in positioning system may also be employed to provide control signals to a servo motor antenna fixture where the LAMBACOM antenna unit is mounted, where the physical direction horizontally and/or vertically could be constantly adjusted. This especially applies for the largest arrays intended for very long range and tropo-scatter operation. The electronically steerable antennas reduce the need for accuracy and angular stability for the servo motor antenna fixture and provides a faster search and lock process for the servo controlled LAMBACOM antenna fixture.

Disclosed herein is a novel Long-range Adaptive Mobile Beam-forming Ad-hoc Communication (LAMBACOM) system that combines highly directive, electronically steerable antenna beams, synchronous system operation, positioning using data from beam-forming antenna system and methods for determining optimum sectors to transmit power to increase mobility and bandwidth and reduce interference to or from other communication units. The LAMBACOM system is provided by several LAMBACOM units that together form an ad-hoc mesh network structure. Several such LAMBACOM units can be arranged at the same communication unit to cover a larger sector, especially for the purpose of allowing fast handover in an ad-hoc network structure.

Transmitter output power of the LAMBACOM system must be high to achieve a long communication range with sufficient link margin. In one embodiment the transmitter peak power is 2 kW equivalent isotropically radiated power (EIRP). In previously known art, this high peak power is achieved either by applying a high power to an omnidirectional antenna or by applying a feed into a focusing metallic structure, such as a parabolic dish. In both cases the antenna feed point represents a potential dangerous area with respect to radiation.

The present invention uses several antenna elements that are spread over a physical area. Each antenna element is phase coherent with the other elements, and radiation from each antenna element is well below the safety limits for direct radiation exposure to the human body, or can also be well below limits for gas ignition in hazardous areas where explosive gases can be present.

In the far-field the phasing of the antennas form a narrow beam that focus the energy and leads to a high EIRP in the direction of interest, and hence, a very high EIRP level can be combined with radiation safety for personnel operating close to the equipment during installation and maintenance. Using a large number of antenna elements will provide low field intensity in the near-field area and an equivalent high power emission in the far-field when the distance to the antenna is safe and the total exposed radiation is well below the hazard limits. By a large number of antenna elements is meant at least 4, nominally 60 and a maximum of 1000 antenna elements. The processing gain in an initial code-word correlator vs. decoding processing gain reaches a limit at approx. 250 elements, for which larger arrays will have to provide more antenna element gain than a monopole in order to maintain a higher processing gain in an initial code-word correlation to achieve a frame-by-frame spatial search method according to this invention. In order to reduce power consumption and heat dissipation for transceivers of the LAMBACOM system, the modulation type in the LAMBACOM for long range communication is constant envelope modulation with no amplitude component. This modulation technique enables the maximum efficiency possible in the transmitter modules that can operate in class C, D and E for high output power levels. The pure phase modulation is implemented digitally which means that it may be changed to conventional QAM or OFDM for operations at shorter range where the transmission power can be reduced. At shorter range, output power amplifier transmitters can be changed to operate in class A or AB mode to provide the amplitude component required for modulation types that are more bandwidth efficient than constant envelope modulation.

In the disclosed system for LAMBACOM with high transmission peak power has a built-in system to control that the transmitted output power complies with national regulations for a given geographical area and the direction of transmission. Included in the system is a local database over peak power limits, operating frequencies and geographic areas, and uses an integrated relative positioning system and communication system to distribute the information between the communication units. If at least one communication unit has a known geographical position and orientation, the rest of the communication units can calculate their geographical positions and directions.

In addition the LAMBACOM system can optionally be equipped with additional sensors, such as accelerometers, gyroscopes, magnetometers and GPS sensors to use this information and share the information with other communication units to increase the system positioning accuracy.

Also included is direction finding circuitry and methods for determining physical direction for an in-coming radio wave in reception mode. A direction estimator is then used to focus the transmission energy in a sector around an estimated in-coming signal when data shall be transmitted back to the other communication unit. Internal lists of communication unit IDs and incoming directions and distances are updated for each received data frame. The method of determining the physical direction to the other communication unit is advantageous compared to techniques, such as for instance MIMO, when the communication units are moving relative to each other. Because communication (radio) channels are changing very rapidly, especially for long distance systems in non-line-of-sight conditions, the energy has to be sent to a sector of interest to ensure that the energy is distributed and flooded over the probable area of interest. By applying a narrow transmitter beam in the area of interest, reflections and channel dispersion spread is reduced.

For long range systems, long time delays for multi-paths is a severe limitation causing inter-symbol interference and requirement for higher encoding gain in modulation, resulting in the loss of data throughput.

The system and method use an optimum combination of the phases for a received signal to achieve the best signal to interference ratio, and based on these coefficients the system calculates the most probable directions of origin of the phase front and creates a phase coefficient set that provides one or several phase front directions where data is sent to the particular communication unit. An equalizer is typically implemented both in spatial and time domain. The method takes into account that both this communication unit and other communication units are moving relative to each other, and creates sector widths that comply with a surrounding area around the communication units where data is sent. This allows for higher mobility properties while maintaining a high network capacity.

The system uses a phase coherent modulated code-word as a start for each data frame. The code-word that indicates the start of each data frame is used for exact time and phase synchronization. This physical modulator scheme allows for a high precision time-of-arrival determination in the receiver section, a channel analysis and a high robustness with respect to interference. The modulation scheme of the LAMBACOM system is a phase modulated code-word using a coherent and synchronously rotating code-book with complex modulated phase coded chips. The total code-sequence is very long and a coherent sliding window is used for coding of the symbol. The length of the symbols can be varied for different modulation data rates where long code-words can be used in cases of large propagation attenuation or large delay spread. The code-book has been prepared with codes that contain low self-correlation for both chip and symbol offsets.

Combined with the coherent sliding window method, inter-symbol interference from following symbols are reduced as well as interference from paths with very long additional delays.

In a scenario where a symbol code-word is not able to provide sufficient margin for error-free decoding in a channel with large delay spread, the method of coherent sliding codeword window will "whiten" and spread the decoding errors in the time and spatial domain, and the forward error correction system may still be able to provide an error free communication (radio) link.

The LAMBACOM system operates coherently where the transmitter and receiver move the sliding window synchronously and coherently with each other. To achieve this coherent operation each transmitted data frame must contain a code-word defining the exact start time of the frame. The frame start code-word is a long code-word, in one embodiment 1024 complex chips, to provide a precise time-of-arrival and phase-of-arrival measurement compared to the local clock reference. The frame start code-word is used for coherent phase front positioning calculations in addition to data demodulation. It also contains an embedded ID so the spatial analysis section and space-time equalizer section can separate frame start code-words from multiple units with corresponding multipath reflections. The frame start code-words may in one embodiment be rotated synchronously to provide link security protection and multipath whitening. To achieve a higher positioning performance the code-words may be constant envelope zero autocorrelation (CAZAC), such as Zadoff-Chu sequence or Golay Pair sequences, that can be alternated adaptively to achieve optimum positioning properties during a communication sequence to provide optimum embedded positioning precision during operation. In a scenario where the direct line-of-sight is lost and the communication link is using a reflection for communication, switching code-words to a type with low auto-correlation side-lobes and searching for the first arrival correlation will maintain positioning of the direct line-of-sight signal while the broadband communication link is sent via a reflective path.

In order to achieve coherent operation in scenarios where the communication units move with relative speed to each other, a special tracking feed-back/feed-forward method is applied for long data frames or in scenarios with multipath combined with relative speed between the transmitter and receiver. The tracking feed-back/feed-forward equalizer system continues to correlate a long sequence of phase modulation chips to calculate the time-of-arrival and phase-of-arrival, correct the local phase reference to maintain coherent operation, analyze the channel dispersion and multipath, and apply an adaptive filter to use the reflections to add the reflection energy to increase the signal to noise and signal to interference ratio. The tracking feed-back/feed-forward method uses modulation data to analyze the changes of dispersion, multipath, phase and time-of-arrival through the decoding of a long frame, and hence, propagation channel training is done constantly without introducing additional link overhead.

The system and method utilize a time synchronized medium control system to combine critical data transmission and avoid link collisions and reserve time for ad-hoc network traffic. In present art this scheme is known from cell based systems where the base stations defines the up- and downlink time slots, but the disclosed system and method do not have a base station. Rather, the nodes/communication units in the mesh network negotiate a common time reference and elect a network coordinator that defines the time-slot services in the system.

The modulation method includes a synchronous coherent demodulation of data for determining the exact frequency deviation between the communication units and time-of-flight for a transmission of a data frame followed by an acknowledge message containing time-of-arrival and turn-around latency, and this method together with a distributed time reference negotiation provides a high-precision common clock reference in the ad-hoc network by using network traffic and with no additional system overhead.

The network coordinator defines the access to time slots for critical data that are transmitted with no medium detect mechanism and in a scheduled transmission scheme so no collisions occurs. This increases the link efficiency compared to present art ad-hoc systems, such as WiFi, that uses Aloha medium sharing mechanisms.

The network coordinator also allocates time slots where the communication units can share the medium with conventional Aloha medium sharing mechanisms. The LAMBACOM is able to combine both highly efficient disciplined TDMA (Time Division Multiple Access) transmissions with guaranteed latency and use the rest of the link capacity for ad-hoc networking in a system with no defined base station or link master. The common negotiation is based on a method involving a majority ruling combined with random processes to avoid instabilities in case of conflicts of equal weight means so that a fast, stable network base time reference is achieved and maintained.

Another mechanism employed is using a different set of link parameters in the different time slots. By this mechanism the network parameters, such as time-of-flight, timeout, retries, modulation type etc., may be optimized for short-ranges in one time slot and for long ranges in another time slot.

The integrated positioning system will determine the range between the communication units, and will place data transmissions in time slots with a given set of optimum link parameters, thereby increasing efficiency for short/medium range as well as for long range. It also allows facile modifications, such as new modulation types, that can be dedicated to given time slots.

The disclosed system and method allow dedication of given time-synchronous time slots to unknown modulation waveforms, and this gives an open, future compatibility to new modulation waveforms and link parameters with co-existence with previous generations of the equipment.

The disclosed receiver system is a fully autonomously frame-by-frame optimizing system that finds the optimum antenna complex coefficient matrix for each frame based on the modulated data at the start of the frame and with no need for other input data.

The system comprises a large number of antenna elements with radio receivers that operate coherently. In each radio receiver, a correlator determines the start of a data frame by correlating a pre-defined long code-word and determines the exact time-of-arrival and phase of a coherent local oscillator system. This information is passed on to a central unit that calculates the optimum complex antenna array coefficients and applies this into a complex multiplier matrix. The digitalized data from each radio receiver is sent to a central unit through a very short digital delay element for each antenna element before the data is combined into a single stream.

The disclosed system and method finds the optimum antenna coefficients that maximize the signal to noise ratio and reduces interfering signals so rapidly that the result is ready before the data pass through the delay element, and hence, the coefficients are set so the data frame can be decoded with an optimum spatial filter that increases the signal to noise ratio, reduce interference to or from other communication units and inter-symbol interference.

The antenna coefficient optimizing system according to the disclosure reduces the impact of flat fading when propagating over reflective surfaces, and exploits effects of surfaces and elevated radio ducting channels for long range communications. Vertical separation between the antenna elements and a method for energy optimization significantly reduces signal ripple, and hence, increase communication range and reliability.

The highly directive antenna beam in the LAMBACOM system according to the disclosure focus the transmission energy to the ducting channel in real time and on a frame to frame level, and selects the optimum path of propagation to optimize the signal to interference level. For long range communication in ducting combined with reflective surfaces, a delay spread of the signal will degrade the possible data throughput.

The disclosed waveform generation, antenna beam forming, reception and positioning is realized in the digital domain, and multiple reception and positioning systems can be implemented in parallel. Multiple transmission antenna beams can also be implemented in parallel by adding the output of multiple instances of the digital modulation and antenna beam forming signal processing chains. The multiple simultaneous beams with simultaneous modulation of different data will increase bandwidth efficiency and network capacity.

The disclosed system and method combine a rotating code-book combined with a feed forward/feed backward time domain equalizer, a spatial equalizer and a highly directive antenna beam to significantly reduce the signal level and delay spread ripple for long range communication.

The disclosed system and method include a built-in positioning feature that uses the highly directive antenna beams to localize the direction to other communication units. A radio front-end correlator provides an exact time-of-arrival and phase result with respect to the local coherent oscillator when a long code-word that starts each frame is detected. The phase relation to the local oscillator for all antenna elements together with a calibration phase reference for each antenna F path is used to find the corresponding physical direction for the received signal.

The positioning feature that is an integrated part of the LAMBACOM system combines high accuracy positioning and a broadband communication system that can provide real time guiding systems where the very low latency on relative position calculation and a mesh network distribution of these sensor data provides means for a low latency regulation loop guiding system.

The guiding system allows the positioning reference communication units to be mobile. A full 3-dimensional geographical location with a 3-dimensional direction vector can be found with only a single communication link to a LAMBACOM unit with a known geographical position and orientation. Multiple LAMBACOM units can be used in the positioning network to enhance precision and increase system redundancy and reliability.

The disclosed system and method have a dedicated microwave calibration network integrated into a printed circuit board (PCB) where the signal from a central reference transmitter is distributed to the RF front-ends of all antenna elements. By the means of an RF switch a reference signal is fed to the RF front-end close to the antenna. The reference network is designed so all physical lengths from the reference transmitter to all the RF front-ends are equal, and this eliminates the relative thermal skew in the network. In addition the calibration network incorporates wideband power splitters that allow the reference network to be used for a wide frequency range. The use of the integrated RF-calibration network is a key to stable high-precision positioning in the field operations.

The disclosed system and method have an accurate time-of-arrival that is calculated based on the modulated code-word that starts every data frame. The exact time-of-arrival is calculated based on interpolation and curve-fitting algorithms to a precision higher than the system sampling time. The time from detection of the starting code-word to the start of a response to the frame is an exactly defined number of internal clock cycles. The exact time-of-arrival, number of internal clock cycles between the received time-of-arrival to transmission of the response frame and other fixed delay is transmitted in the response message. When the response message is received, the exact turnaround time, and hence, the time-of-flight and physical distance can be calculated. When this information is combined with the result from the direction positioning, a three dimensional relative position can be calculated to all other communication units in the network based on the normal wireless traffic.

One embodiment disclosed herein include several antenna panels at the same site to cover a larger sector, and a special mechanism is built into a medium access control (MAC) that allows fast handover of target panels in an ad-hoc network structure. The data frame acknowledge message (ACK) contains both destination and source ID, and hence, if one panel at the same site as the destination panel observes a retry transmission by checking the sequence number in the frame, all the panels at the given site will transmit an ACK, the transmitting panel will then detect that the ACK is from another panel than the destination panel, and will update the routing table to transmit default to the original panel. By this mechanism a panel handover could take place during a single retry of a frame transmission, and the method does not require any other special procedures.

The disclosed system and method include a method of seeking and acquiring connection between panels. This is typically performed by modulating code-words with information about the origin of transmission, information about transmission direction and sequencing of code-words. Each code-word is sent in a different direction. By this technique a spatial scan for another communication unit can be done at a minimum of time, and a receiver at the maximum range will be able to decode the best codeword. The built-in positioning system will determine the direction of the received code-word and Information in the code-word and the embedded coding of origin ID enables the communication unit to respond back with the transmission energy in the optimum direction and reporting the optimum direction of transmission that was measured. When this information is received the two communication units have determined an optimum sector of transmission, and since this method is very fast, in one embodiment the total ranging time is less than 1 ms, the method can be used to maintain link in rapidly changing non-line-of-sight conditions with moving units.

A fast ranging method is also provided herein, where each of the individual antennas transmits a time-shifted version if the initial code-word with some additional information about the source ID and the antenna element number coded into the code-word. The decoder in the receiver may in the correlation sequence separate and optimize the path from each of the antenna elements on the transmitting LAMBACOM unit to each of the antenna elements of the receiving LAMBACOM unit. The total time of this fast ranging method is the time to transmit the code-word plus the number of antennas times the time to transmit one chip. This time is shorter than the delay element on the receiving LAMBACOM unit, and hence, a full spatial ranging can be achieved for each received data frame.

The disclosed system and method provide a digital data streaming cluster architecture with concentrators where data is aggregated in concentrator nodes and sent through high-speed data busses. The high-speed bus system has a distributed error handling system that is able to limit the loss of functionality if a cluster unit or hardware line in the high-speed bus suffers from an error condition. The high-speed bus system is arranged as a plurality of single-wire serial data lines where a limited number of logical data channels are dedicated for each physical connection line. In conventional high-speed bus designs, failure of a connection line in bus will halt the bus operation. According to the disclosure, failure of one of the single-wire transmission lines will limit the consequence to loss of a limited number of logical channels. The high-speed bus system detects errors using a built-in error detection mechanism for each single-wire line, and reports which logical channels that are operating and logical channels with transmission errors.

An embodiment of the disclosed method can accordingly be summarized in the following steps:

a. by means of spatial analysis of signals from the F-transceiver section performing a spatial scan for a phase modulated, coherent code-word from other communication units, b. provide beam-forming by passing information from the spatial analysis in step a) to a digital antenna beam-former (17) before first RX data are passed through a plurality of delay elements (18a-n) of the delay section (18) for achieving an optimum antenna shape and demodulation of the first received RX data from any direction, c. calculation of spatial angular direction of each received communication message from another communication unit in the network, d. measurement of time-of-arrival between the communication units based on correlation of a code-word that is included in each of communication messages in the network, e. transmission of a response message to other communication units containing information about time-of-arrival for a decoded message and delay time from the time-of-arrival to the transmission of the response message, f. mutual exchange of position information between all communication units in the network through the same RF transceiver section that are used for positioning.

Further details and preferable features of the invention will appear from the following example description.

BRIEF DESCRIPTION OF THE DRAWINGS

The invention will below be described in more detail with reference to the attached drawings, where.

DETAILED DESCRIPTION

Figure 1:
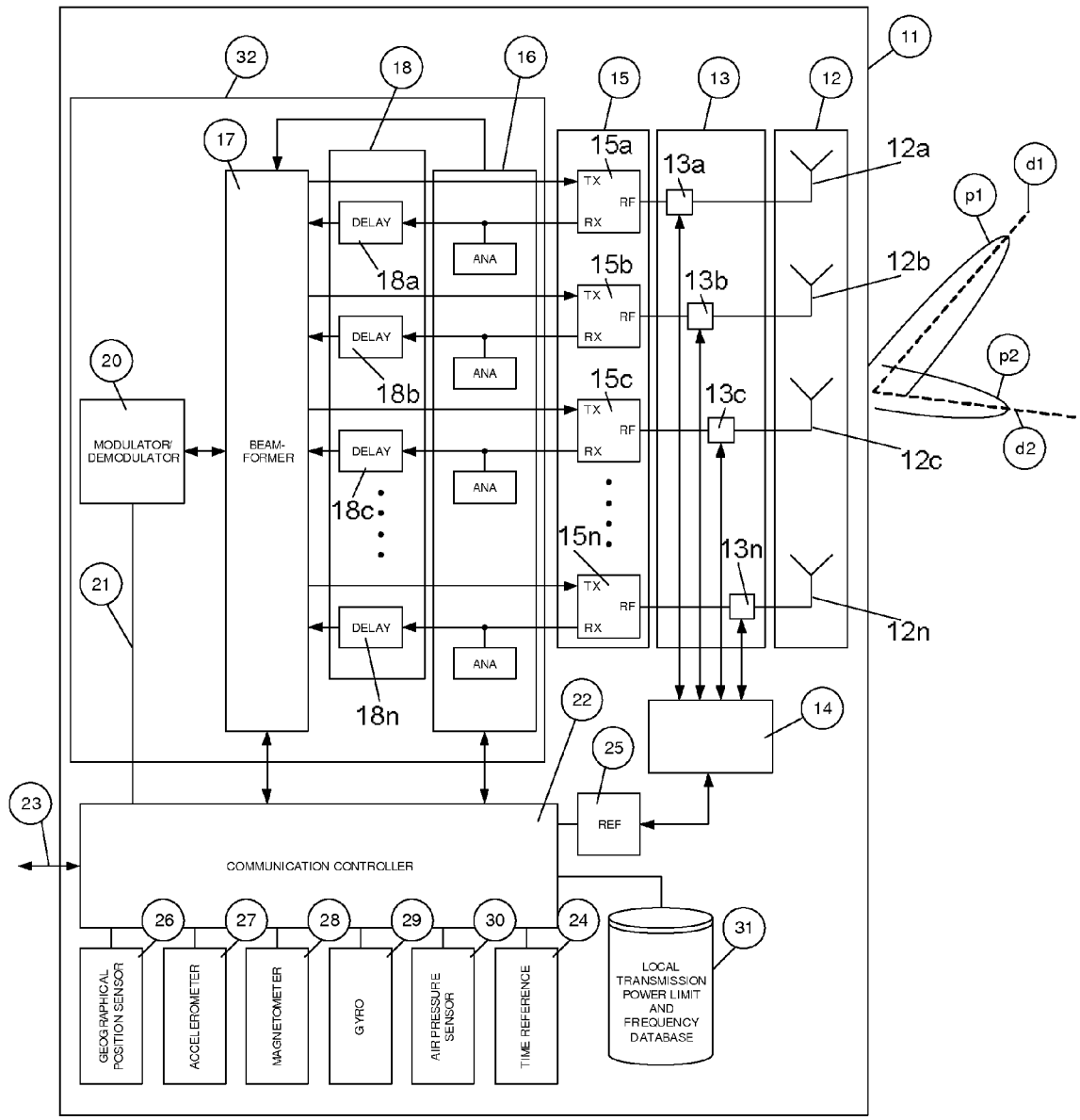
FIG. 1 is a block diagram of a LAMBACOM unit according to the invention.

Reference is now made to FIG. 1 which is a block diagram of an embodiment of the disclosed system, implemented as a LAMBACOM unit 11. The Figure illustrates internal modules of an embodiment of the LAMBACOM unit 11 for arrangement to a communication unit. The LAMBACOM unit 11 includes as main elements an array antenna section 12, a positioning system 32, a communication controller 22, a database 31 and a data link 23 to other equipment utilizing positioning data and communication data stream to other communication units.

The array antenna section 12 includes a plurality of integrated antenna elements 12a-n which are connected to a switching section 13 including a plurality of switching units 13a-n which select whether an integrated calibration network 14 is to be connected to a plurality of RF transceiver units 15a-n of a transceiver section 15.

It should be mentioned that the calibration network 14 can be excluded in another embodiment of the LAMBACOM unit 11, and then can accordingly the switching section 13 also be excluded.

In receive mode a digitalized RX signal is passed through a spatial phase front analyzer section 16 that searches for a modulated code-word and determines exact time-of-arrival of peak correlation, signal to noise ratio, signal to interference ratio, multipath parameters, Doppler spread, and phase relation for each RX signal on the respective parameters with respect to an internal clock reference. This information is passed to a digital antenna beam-former 17 before the first RX data in a data frame are passed through the plurality of delay elements 18a-n of a delay section 18. The beam-former 17 applies these calculated phase coefficients to the plurality of RX streams to maximize the signal to noise ratio and to suppress interfering signals. The combined signal is passed to a modulator/demodulator unit 20 and digital frame data is transferred by 21 to a communication controller 22 and then to/from a local network connection 23. The digital communication controller 22 uses a local time reference 24 to generate a common high precision clock reference signal and lock all RF transceivers 15a-n to this time reference. When an analog propagation delay in reception mode shall be calibrated, the communication controller 22 sets a local RF reference transceiver 25 in transmission mode, and the RF signal passes through the calibration network 14 to the switching units 13a-n where this signal is connected to the RF transceivers 15a-n. The system then forms a closes loop and calibrates each reception propagation path for each of the analog propagation paths. To measure the analog propagation delay in transmission mode, the LAMBACOM unit 11 is set in transmission mode and the plurality of RF transceivers 15a-n are set in transmission mode, one at a time. The RF switches 13a-n connect the RF outputs of the RF transceivers 15a-n to the calibration network 14. The reference transceiver 25 is set in reception mode. This forms a closed loop and the analog propagation delay paths for transmission mode are calibrated. When the reception and transmission propagation delays are calibrated, the communication controller 22 can use the phase coefficients from the positioning system 32 in reception mode to calculate exact physical direction of origin for the received signal. The communication controller 22 can also transmit power in an exactly defined physical direction. The relative positions from the positioning system can also be used as control signals for a servo controlled antenna fixture where the LAMBACOM unit 11 is mounted in order to constantly change the physical direction of the LAMBACOM unit 11 in the horizontal and/or the vertical direction. Several coefficient sets may be combined in reception or transmission to form a plurality of receiver or transmitter beams with physical direction d1, d2 and power distribution sectors p1, p2 which are shaped based on estimation of the degree of mobility for the communication unit.

A process of measuring distance between two communication units A and B involves the following steps:

a) Communication unit A transmits a message starting with a modulated code-word to communication unit B where information about the origin communication unit A is embedded in the message.

b) A receiver correlator in communication unit B determines exact time-of-arrival by correlating the code-word starting the message and then decoding the message. By interpolation the time-of-arrival is calculated to a precision higher than the system sample clock.

c) A receiver decoder in communication unit B measures the clock frequency deviation between communication unit A and communication unit B.

d) Communication unit B transmits a message to communication unit A starting with a modulated code-word and a message including the measured time-of-arrival, the clock frequency deviation and turnaround latency time from the received time-of-arrival to peak correlation of the transmitted code-word.

e) A receiver correlator in communication unit A determines the exact time-of-arrival by correlating the code-word starting the message and then decodes the message and determines the frequency deviation between communication unit B and communication unit A. By applying the message data about the reported time-of-arrival in communication unit B, the frequency deviation from communication unit A to communication unit B, the measured frequency deviation measured from communication unit B to communication unit A and the turnaround latency time, communication unit A is able to calculate exact accumulated time-of-flight from communication unit A to communication unit B and communication unit B to communication unit A, and hence, by applying the speed of light to the equation, the distance from communication unit A to communication unit B can be calculated.

The communication controller 22 is further arranged to establish a list of relative positions by combining positioning data from the phase front analyzer module 16 that produces direction and time-of-arrival that enables time-of-flight measurement, and hence distance to other communication units. In addition the communication controller 22 may add local sensor information, such as geographic position from a geographic position sensor 26, such as a GPS, GLONASS, GALILEO receiver module, physical orientation attitude data from an accelerometer sensor 27, magnetometer sensor 28 or gyroscope 29, and altitude information from an air pressure sensor 30. The sensors 26-30 are optional sensors to improve the positioning accuracy and increase system redundancy. The local time reference 24 may be synchronized with the geographical position sensor 26 if the geographical position sensor 26 is present. The position and attitude data are exchanged through the wireless communication through the antenna elements 12a-n, and the communication controller 22 is then able to combine all this information. If at least one LAMACOM unit 11 has a geographically fixed position and attitude information, all the LAMACOM units 11 in the network may calculate their fixed geographical position and attitude. The information is used together with a local database 31 consisting of geographical information about frequency and transmission power limits. The communication controller 22 uses this information to set transmission peak power according the current geographical position and attitude. The local database 31 is updated through the local area network connection 23 or through a wireless data link through the antenna elements 12a-n.

The distributed coherent clock reference system and synchronous, disciplined medium sharing method in the ad-hoc network disclosed herein requires a negotiation between the communication units in the network to establish the common time reference. The synchronization process involves the following method steps:

a) A predefined parameter determines maximum allowed clock reference deviation allowed for nodes/communication units in the system/network. If the clock deviation is less than the defined limit, the nodes/communication units are defined to be in synchronous operation.

b) The local clock reference is sent as a message over the communication link together with the number of communication units that are in synchronous operation with the communication unit transmitting, c) All communication units that receives this message are able to determine the deviation of the clock reference for the received frame relative to the local time reference, d) A list containing ID of the source communication unit, reported synchronous nodes/communication units for the source communication unit, time reference deviation and time jitter between measurements with respect to the local reference, is maintained, e) After a defined time period the list is parsed. The number of communication units in synchronous operation and within jitter limits corresponding to two times the time-of-flight of the maximum distance of operation are then determined according to the following steps:

I. If another communication unit reports that the number of synchronously operating communication units is higher than the number of synchronous communication units measured in the local list, the time reference for the other communication unit is adopted. If there is more than one communication unit in the list that complies with these criteria, the time reference from the communication unit with the highest number of reported synchronous communication unit is adopted.

II. If another communication unit reports that the number of synchronously operating communication units is less than the number of synchronous communication units measured in the local list, no actions of changing the local time reference is done. This distributed majority rules scheme algorithm ensures that a node entering a network cannot change the time of the other nodes in the network.

III. If another communication unit reports the same number of synchronously operating communication units a random process determines if the time from the other communication unit shall be adopted or not.

IV. If a time reference from another communication unit is adopted by this communication unit and the time difference between the current time reference and the new time reference is more than the maximum clock reference deviation, the number of reported synchronously operating communication units is the number reported from the other communication unit plus one, since this communication unit is now also in synchronous operation with the other communication units, the total increase by one.

V. The list is cleared.

f) If the received data frames are below a given threshold, the local LAMBACOM unit enters into an initial network association that involves the following steps:

I. Searching for messages from other stations in the network with variable frequency offset in the receiver to obtain information about network information and timing information.

II. If no received messages are detected within a defined timing period, network probing messages are sent to search for other LAMBACOM units in the network.

III. If one or more than one frame is received, the process of determining the local timing reference according to step e) is executed.

g) The steps a)-f) are repeated continuously or at predefined periods as long as the number of received data frames are below a given threshold.

Figure 2:
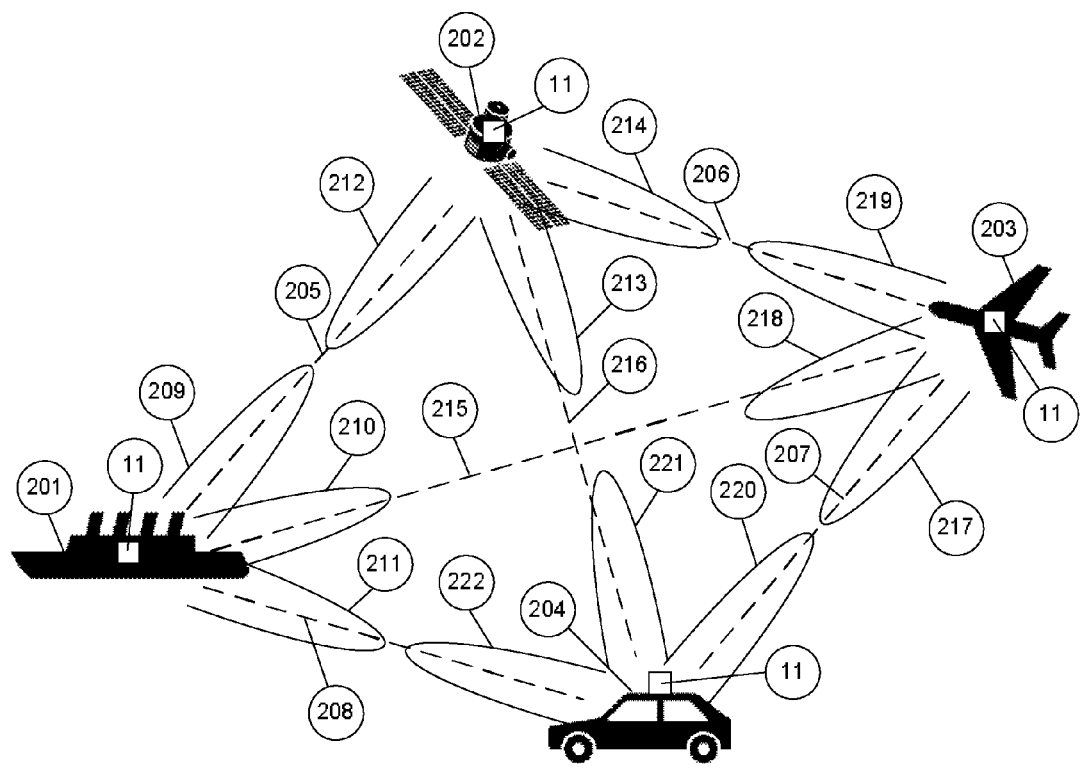
FIG. 2 is an illustrative drawing of the use of the present invention.

Reference is now made to FIG. 2 which is an illustrative drawing of the disclosed system and method in use. As shown, a plurality of moving communication units operates in an ad-hoc mesh network. In this embodiment, communication units in the form of vehicles or portable handheld units 204 provided with LAMBACOM units 11 operate on the ground, communication unit in the form of aircrafts 203 provided with LAMBACOM units 11 operate in the air, communication units in the form of vessels 201 provided with LAMBACOM units 11 operate on the sea, and communication units in the form of satellites 202 provided with LAMBACOM units 11 operate in space. Each communication unit 201-204 in the network is able to transmit data directly to another by the use of narrow directive antenna beams. The narrow antenna beams 209, 210, 211, 212, 213, 214, 217, 218, 219, 220, 221, 222 are directed toward the best transmission path for the communication units 201-204 in the network while the shortest physical paths between the communication units 201-204 in the network are shown by 205, 206, 207, 208, 215, 216. Each of the communication units 201-204 may transmit one data packet at a time, or in another embodiment may transmit data to several communication units simultaneously. The positioning system 32, as described above, in the network continuously tracks the direction and distance to the other communication units and their relative position and orientation by the integrated antenna positioning module 32 in the communication system. If one of the communication units is at a fixed position and orientation, or has integrated geographical positioning sensor 26 and attitude sensor 29, the absolute position and orientation of all the communication units 201-204 in the network are distributed through the wireless network.

In another embodiment the network is a network for unmanned aerial vehicles (UAV) where the ground communication units are moveable. Sensor data may be streamed from one UAV to a moveable ground communication unit while another ground communication unit controls the UAV operation. The mesh network structure allows several ground communication units to have redundant functions in order to take over operation if one ground communication units fails or gets out of radio coverage to the UAV.

Figure 3:
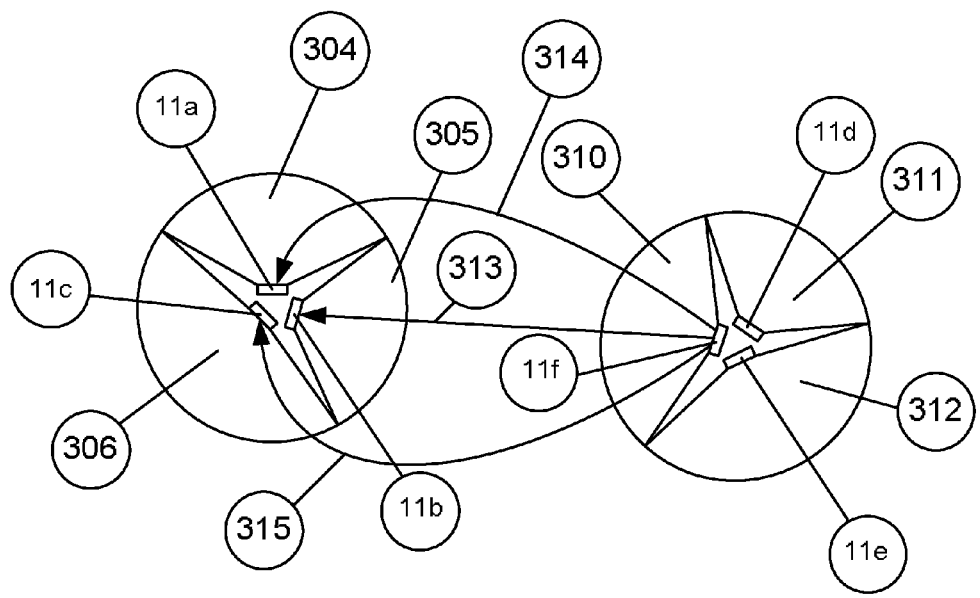
FIG. 3 is an illustrative drawing of a hand-over situation between two communication unit sites.

Reference is now made to FIG. 3 which is an illustrative drawing of a hand-over situation between two communication unit sites in one embodiment of the disclosed system and method. Each communication unit site is located at a moving unit such as a vehicle or an UAV. At one communication unit site three LAMBACOM units 11a, 11b, 11c are mounted to cover three sectors 304, 305, 306, and at the other communication unit site three LAMBACOM units 11d, 11e, 11f are mounted to cover three sectors 310, 311, 312. In addition to the optimum transmission path between the two communication unit sites 313, data is also transmitted by other paths 314, 315 to the other communication unit site. If the transmission using the nominal path 313 is successful, this is detected by LAMBACOM unit 11f by the reception of an acknowledge message from LAMBACOM unit 11b. The acknowledge message includes both the ID of LAMBACOM unit 11b and the ID of the transmitting source, i.e. LAMBACOM unit 11f. If the transmission from LAMBACOM unit 11f to LAMBACOM unit 11b fails, the LAMBACOM units 11a and 11c will be able to decode this by monitoring a wireless sequence number. When the number is not changed, it indicates that the transmission is a retry. If this occurs, both LAMBACOM unit 11a and LAMBACOM unit 11c sends an acknowledge message to LAMBACOM unit 11f. The transmission may be done at the exact same time if the modulation coding provides isolation between the two competing signals, or it may be sent with some randomness in time to ensure that there is less probability of collision if the coding is less robust. LAMBACOM unit 11f will decode the strongest message or the message arriving first in time, and by decoding the ID, it will determine that another LAMBACOM unit 11a or LAMBACOM unit 11c has received the message on behalf of LAMBACOM unit 11b. The re-transmission then stops, and the next transmission is directed to LAMBACOM unit 11a or LAMBACOM unit 11c instead of LAMBACOM unit 11b.

Figure 4:
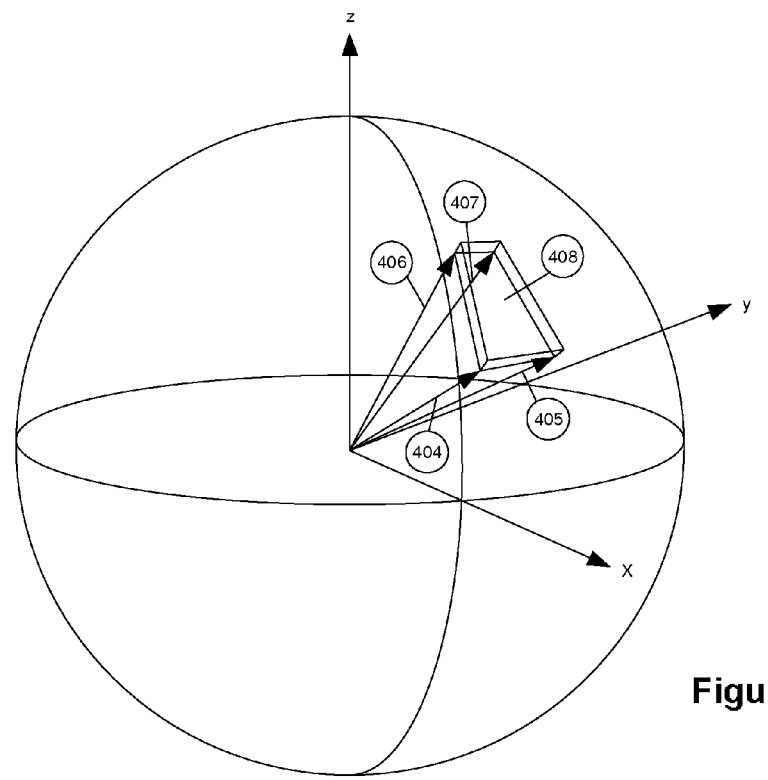
FIG. 4 is an illustrative drawing of a spatial volume for relative positioning.

Reference is now made to FIG. 4 which is an illustrative drawing of a spatial volume for relative positioning. A spatial sector defined in a local reference coordinate system with x, y and z axis. Direction vectors 404, 405, 406, 407 define a confidence interval for the measurement of a single direction measurement. Together with the confidence interval for the distance measurement this forms a spatial volume 408 for which a signal from another communication unit can fall within from a single measurement of direction of a received packet together with time-of-arrival of the received packet. The defined operational spatial volume of a communication unit also takes into account calculated relative speed that is calculated based on two measurements together with a calculated Doppler-shift measurement. The antenna beam for transmission is adapted to apply power into the calculated spatial volume to provide a reliable and stable radio link when the communication unit is moving.

Figure 5:
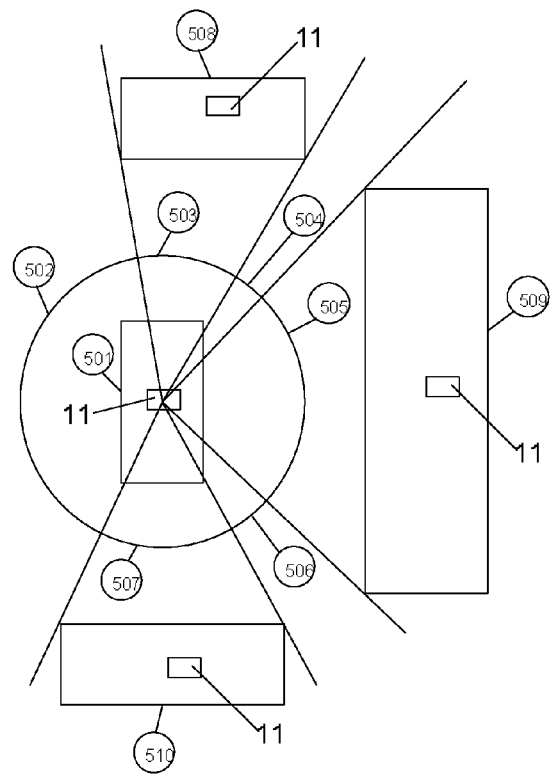
FIG. 5 is an illustrative drawing of an operating interference scenario.

Reference is now made to FIG. 5 which is an illustrative drawing of an example of an operating interference scenario. A moving communication unit 501 is equipped with a LAMBACOM unit 11 to form an omnidirectional radio link operation. In different embodiments the moving communication unit 501 could be a manned or un-manned vehicle for terrestrial, maritime, aerial or space operation. The communication unit 501 is surrounded by communication units 508, 509, 510 in different sectors 503, 505, 507. Sectors 502, 504 and 506 are free of interference objects, and hence, the transmission peak power can be unlimited or limited by regulations for the given geographical area for which the moving communication 501 must comply. Transmission power to another LAMBACOM unit 11 located at communication unit 508 close to communication unit 501 is reduced to the amount of power to maintain a stable link, but to prevent the LAMBACOM unit 11 at communication unit 508 from saturation and reduce interference to the LAMBACOM unit 11 at communication unit 508 while the communication unit 501 is operating in other sectors. Hence, all power sent in sector 503 complies with this defined power limit in a defined time slot where short-range communication is located. For other time slots for long range traffic, the power limit may be set to another peak level. The communication unit 509 is placed in another area of regulation than communication unit 501. When transmitting in the direction of this other regulation area, the power is limited to a value defined by the local regulation database 31. The communication unit 510 is in an area containing special sensitive equipment or is in an area for which a minimum radiation level should be emitted. Examples of such areas are danger areas with gas explosion hazard, areas with living quarters for personnel, telecom towers with a concentration of critical radio transmitters and receivers, and sectors where hostile military forces are located. In this area the antenna beam contains a notch for minimum radiation.

This also applies for the reception beam in order to have adaptive null-steering and spatial equalizer methods for reduction of interference to a minimum in this sector.

Figure 6:
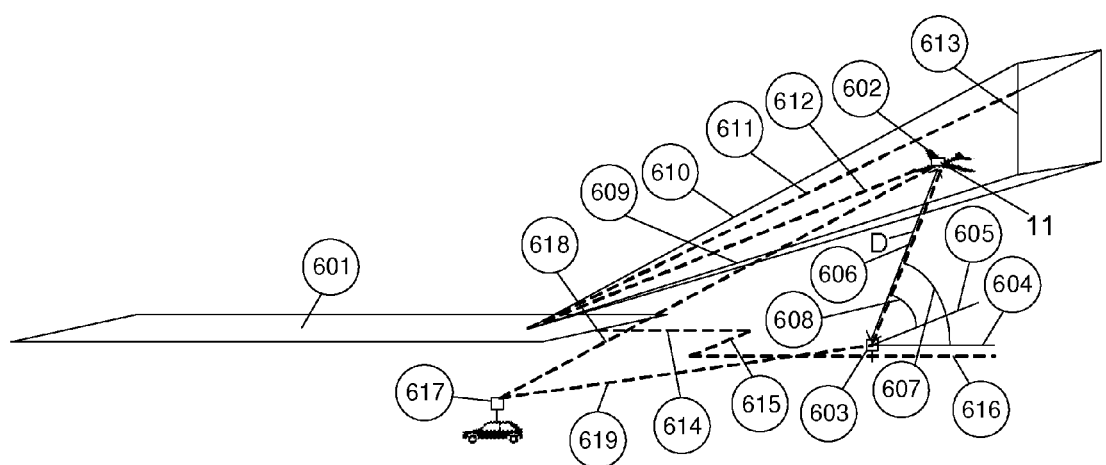
FIG. 6 is an illustrative drawing of an example of a guiding system implemented according to the present invention.

Reference is now made to FIG. 6 which is an illustrative drawing of a positioning and guiding system implemented according to the disclosure. In this example an unmanned aeronautical vehicle (UAV) 602 equipped with a LAMBACOM unit 11 is guided towards a landing field 601 at a defined path 612. A low latency, broadband communication link is established between the UAV 602 and a ground unit 603 which is provided with a LAMBACOM unit 11. The positioning system in the LAMBACOM unit 11 of the ground communication unit 603 calculates an angle 607 which is the angle in a plane defined by the normal of a plane defined by axis 604 and 605 and the axis 604. The ground communication unit 603 also calculates an angle 608 to the UAV 602 which is the angle between the normal to a plane defined by the axis 604 and 605 and the axis 605. Distance D to the UAV 602 is also calculated. The LAMBACOM unit 11 in the UAV 602 has the same positioning system as the LAMBACOM 11 in the ground communication unit 603 and calculates the relative position to the ground communication unit 603 represented in local coordinate system with a vector towards the ground communication unit 603 and the distance D. The relative positions calculated in the UAV 602 and in the ground communication unit 603 are exchanged through the low latency broadband communication system created by the LAMBACOM units 11 at a high update rate. By combining these results together with information about the ground communication unit 603 geographical position and orientation, the UAV 602 can calculate its geographical position, heading, pitch or roll angle with high accuracy, high update rate and low measurement latency time. The UAV 602 is guided through a corridor 613 defined by an elevation window defined by 609, 610 and direction defined by 610, 611. The ground communication unit 603 may be displaced with a distance along 614 a runway and across 615 the runway and a distance along the runway 616 and also at a different altitude level relative to the runway threshold. In an embodiment, a plurality of ground communication units 603 can be used to increase precision and redundancy. The ground communication unit can also be a mobile unit 617. The geographical position to the mobile unit 617 can be determined by on-board sensors, or by relative positioning to a ground unit 603 through a communication link 619. The UAV 602 is not depending on triangulation to establish its relative position in the LAMBACOM communication system, but can use a communication link 618 in addition to a link 606 to enhance positioning accuracy, redundancy and measure the positioning system integrity if the positions to all the other LAMBACOM units diverge above a given limit.

Figure 7:
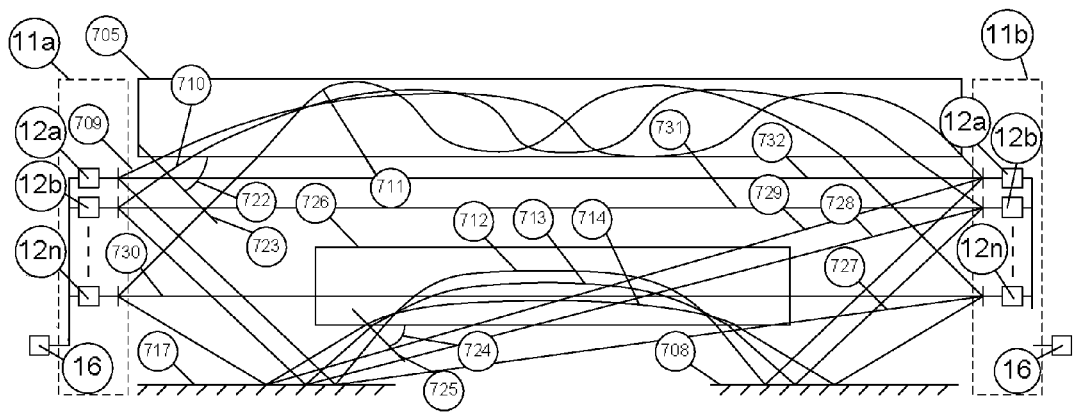
FIG. 7 is an illustrative drawing of an example of an application with highly reflective surfaces and/or ducting radio channel propagation between two LAMBACOM units.

Reference is now made to FIG. 7 which is an illustrative drawing of an example of an application with highly reflective surfaces and/or ducting radio channel propagation between two LAMBACOM units 11a, 11b. The two LAMBACOM units 11a, 11b are placed at a long physical distance from each other. A reflective surface 717 reflects the emitted radio signal, and the reflected signals 727, 728, 729 are combined with direct signals 730, 731, 732. As the phase difference of the direct and reflected signals approaches 180 degrees, the result is an attenuation of the received radio power. This effect is denoted as flat-fading, and if the distance to the reflective surface is short, the result will be a large physical area where the signal is attenuated over a large bandwidth. The arrangement of antenna elements 12a-n with different distance to the reflective surface and the use of an adaptive phase front analyzer 16, results in that the received signal attenuation is significantly reduced. In one embodiment, for C-band operation it was demonstrated that a flat-fading ripple of 40 dB when propagating over a reflective surface could be reduced to 20 dB with a 25 cm antenna element separation. If a ducting channel close to the ground level 726, the method for the transmission will determine to transmit more energy in this channel or search and find a higher elevated ducting channel. The transmitting LAMBACOM unit is optimizing wave-front 725 when entering the ducting channel with an angle 724 to the ducting channel so that refraction and direction change in the ducting channels 712, 713, 714 could reflect in a reflected surface, or could also be directed directly to LAMBACOM unit 11b without a reflection at 708. The low elevated ducting channel 726 could be formed in certain given conditions caused by evaporation ducting over water or in other conditions where humidity, temperature or wind gradients form a change of propagation conditions. The troposcatter volume 705 could be utilized since the combined transmission power, TX and X antenna gain and receiver sensitivity is in the range of 160 to 260 dB where troposcattering and utilization of ducting channels are possible. The tropo scatter volume 705 could be a high elevated duct caused by humidity gradients or by wind gradients.

Presence of metallic objects, such as airplanes, in the tropo-scatter volume 705 could also be used as a part of the transmission channel. A spatial digital processing adaptive antenna beam system will then be utilizing tropo-scattering effects by adjusting entrance angle 722 that defines a phase front 723 entrance to the tropo-scatter volume 705 so that combined radio energy paths 709, 710, 711 will perform a constant optimization with respect to directing the power to the same air volume seen over the horizon by the transmitting LAMBACOM unit and receiving LAMBACOM unit. The combined reflection of all types of reflectors in the air will be used to achieve a stable radio link. Examples of such reflective objects may be airplanes or balloons covered with reflective material. Example of other elements resulting in radio wave reflections or refractions are weather conditions with humidity gradients, rain, clouds, air eddies and air streams. A LAMBACOM unit could also transmit a data frame targeted for itself, and upon reception of this frame, the analysis of time-of-arrival, channel dispersion, doppler shift, signal strength and direction of the received signal could be used as a radar feature where other objects could be detected, atmospheric weather conditions, such as wind, rain or concentration of contamination, could be detected.

Figure 8:
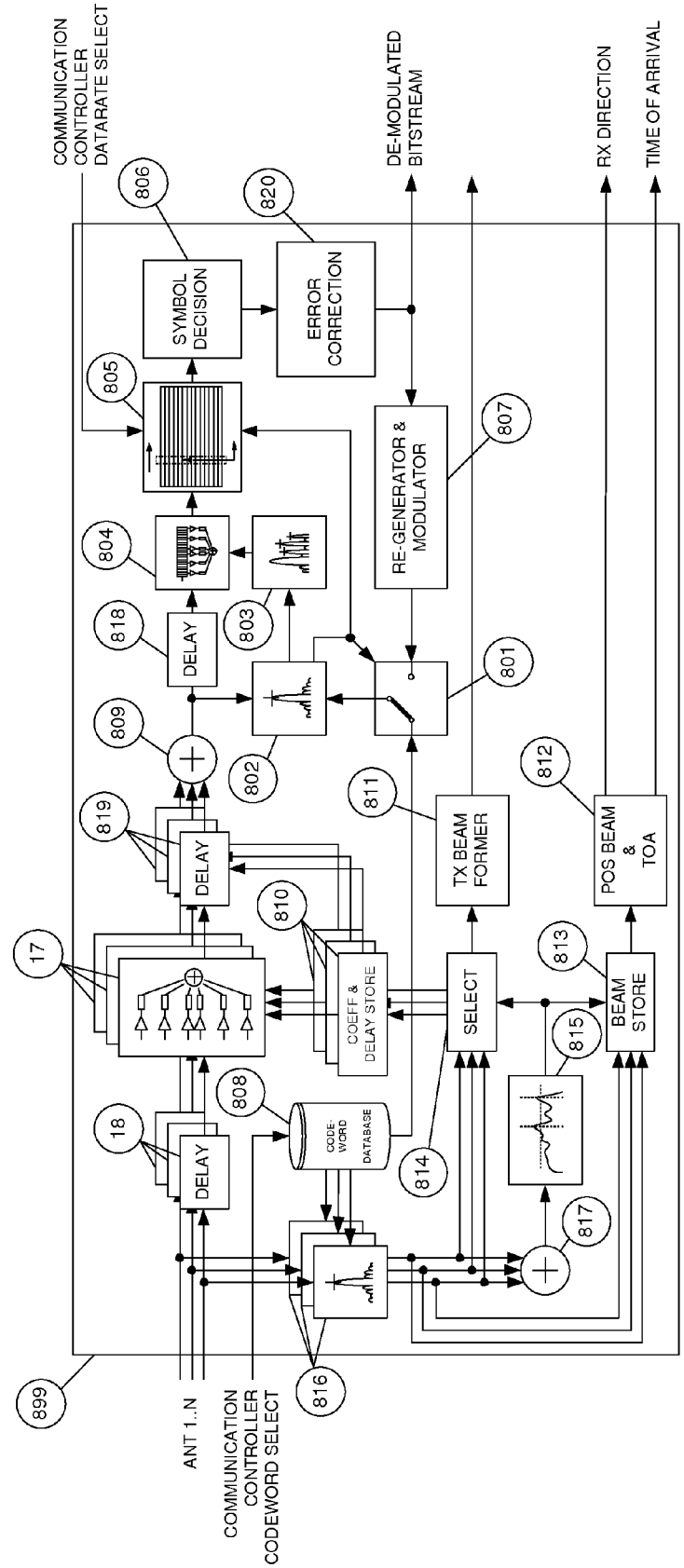
FIG. 8 is a block diagram of a front end digital processing system used in the receiver chain of a LAMBACOM unit.

Reference is now made to FIG. 8 which is a block diagram of the front end digital processing system 899 used in the receiver chain of the LAMBACOM unit 11. The digital signal processing unit 899 operates at a system clock that is phase locked to a RF local oscillator 905 (see FIG. 9) in the analog sections of the receivers. The digital input signals 1 . . . N from a plurality of N radio transceivers 15a-n are fed into the digital signal processing module. In one embodiment of the communication unit 11, a plurality of digital signal processing units 899 are embedded to perform demodulation of several data streams in parallel. In FIG. 8 the number of transceivers, N, is set to 3, as an example. The delay module 18 enables the system to search for optimum directions, antenna element coefficients and adaptive filter coefficients before the settings are applied to a complete decoding of the frame with the optimum beam-forming configuration. As disclosed, the beam-forming is updated for each received data frame. The delay at 18 also allows side information encoded orthogonally in the first lead-in codeword to be received with the full gain of the system. This side info contains information of the transmitted frame, such as transmitter identification, transmission power, transmitter beam-forming settings and equalizer settings, and is used to verify sender site/unit and improve ranging performance. This info makes it possible to verify if a peak/vector-set of interest belongs to the correct unit in case of interference. A correlator module 816 of correlators is applied to each of the 1 ... N digital receiver inputs. The correlators 816 search for a long, at least 256 complex chips, phase modulated complex chip codeword according to a code-book database 808 that select code-words according to the input from the communication controller 22. The long code-word is selected based on minimum cross-correlation with other code-words used for payload encoding and other signaling, as well as minimum cross-correlation properties for channel estimation. The selected code-words contain an embedded ID that uniquely identifies the communication unit 11. The communication controller 22 may rotate the code-words for encryption purposes or use special coding sequences, such as constant envelope zero autocorrelation (CAZAC) or Zadoff-Chu sequence or Golay Pair sequences, for optimum positioning performance. The correlators 816 find correlator peak amplitude, a phase as a set of vectors and the embedded ID that identifies the communication unit 11 that was the origin of the code-word. The amplitudes of each correlator 816 output are fed to an amplitude adder 817, and an amplitude search module 815 searching for peaks in amplitude with embedded ID matching the ID from the correlators 816. A given number between 1 and M of beam-forming coefficient sets are stored in a beam store module 813. After a given time, the first arriving correlation peak and beam-forming coefficients is used by a positioning beam and time of arrival module 812 to determine the physical direction and exact time of arrival of the received data frame. A spatial adaptive tap selection module 814 selects a number of reflections according to the analysis of the amplitude search module 815. Each of these reflections has an antenna coefficient set which gives an optimum signal to noise ratio and an optimum signal to interference ratio. These coefficients are then sent to a coefficient store module 810 that holds the complex filter coefficients, amplitude and phase, of the adaptive spatial beam-forming filters 17. The selected reflections from the beam-forming coefficient sets are sent to adaptive delays 819 so that each of the selected reflections in the spatial domain is time aligned and added coherently. By this method, the system searches for a multiple of reflections, applies an optimum antenna coefficient set for each reflection and adds the energy for each reflection in order to optimize the signal to noise and signal to interference ratio. By analyzing a number of arriving reflections, the selector module 814 determines the optimum beam-forming coefficient set for reception. This information is sent to a transmission (TX) beam-former 811 which converts the optimum reception antenna coefficient set to an optimum transmission beam-forming set. The calculation of coefficient sets in the transmission beam-former 811 includes a number of options for the communication controller 22 to select from. One set is the inversion of coefficients for retro-reflective operation. Another coefficient set is to apply wave-front decomposition for a number of possible physical directions for the transmission beam-forming. The communication controller 22 can select from the prosed different transmission beam-forming coefficient sets according to information given by the TX beam-former 811 according to the set for best signal to noise ratio, signal to interference ratio, least Doppler skew, least Doppler spread, lowest inter-symbol interference, lowest latency and selection of direction of transmission according to requirements of limitation of emissions in a given sector. The time needed to find and set the parameters, for the adaptive spatial beam-forming filters 17 and the adaptive delay modules 819, is shorter than the delay in the delay module 18. The pre-calculated optimum spatial adaptive filter is then used for the signals and the resulting signal is then fed to a time-domain correlator 802 that initially before a data frame lead-in code-word is detected, correlates with code-words from the same database 808 as the spatial correlator. It is further arranged a space-time equalizer/beam summation 809 between the delay modules 819 and the time-domain controller 802. The reason for having space-time equalizer/beam summation 809 first and then an additional time only equalizer afterward is the taxing level of DSP and FPGA (Field-programmable Gate Array) resources needed in the space-time equalizer. The first stage has relatively few taps to save logic/power, while the second equalizer, operating on a single signal, can be implemented with much higher complexity compared to the first stage. The delay 18 makes it possible to analyze the start code-word once more after the space-time equalizer coefficients have been set. The correlator 802 and an analyzer 803 find the optimal parameters for this new channel created by the first space time beam-forming equalizer. This second equalizer adapts itself during packet reception to allow improved performance in rapid fading channels. The ideal case would be to feed the demodulated M-ary code-words from a re-generator modulator 807 to a second set of correlators at each antenna input, but this would be very expensive in a wideband system with respect to resources, cost and power use. Using the presented topology, all the advantages of a full space-time system with continuous adaption during packet reception is achieved while computational resources are minimized. The time of setting the coefficients of an adaptive filter 804 is shorter than a delay 818. After the data has passed through the adaptive filter 804 a sliding window correlator 805 performs a multiple in-parallel correlation of long code-word chip sequences represented in vertical lines. Each line represents a coded symbol. The sliding window starts at the start of the long sequences at t=0 when the lead-in code-word is detected by the correlator module 802. The window steps a determined number of chips according to the selection of number of chips per code-word done by the communication controller 22. The communication controller 22 may also change code-books for encryption purposes, number of different symbols (vertical lines) to optimize data rate and inter-symbol interference properties. The code-books are prepared such that the cross-correlations between vertical lines, horizontal symbols and the frame start code-word are all at minimum level. These properties give optimum multipath and inter-symbol interference properties. It also enables search for new frame start code-words from other communication units in other spatial directions for parallel instances of the digital signal processing system 899 during demodulation of a data frame. If a multipath has a long time delay, and a symbol chip sequence gives poor inter-symbol cross-correlation, the next symbol will be a different code-word, and this property spreads the errors. A forward error correction module (FEC) 820 is then able to provide an error free link in heavy multipath propagation conditions. The winning symbol with highest correlation from a sliding window correlator 805 is fed to a symbol decision unit 806 that converts the symbols into a demodulated bit stream. The demodulated bit stream is sent to the error correction module 820 that corrects bit errors based on added information in the bit stream. Example of such an error correction method is the Reed-Solomon error correction method. When the initial lead-in code-word is detected by the correlator 802, a switch 801 is switched so that correlation is no longer is taken from the code-word database 808, but from the re-generator modulator 807. By this method, the correlator 802 can update the adaptive filter 804 continuously or at given time intervals during the demodulation of a data frame. The correlator 802 also tracks phase errors, and hence, the feedback mechanism can maintain coherence for long data frames as well as adjustments to the adaptive filter during demodulation of a data frame.

Figure 9:
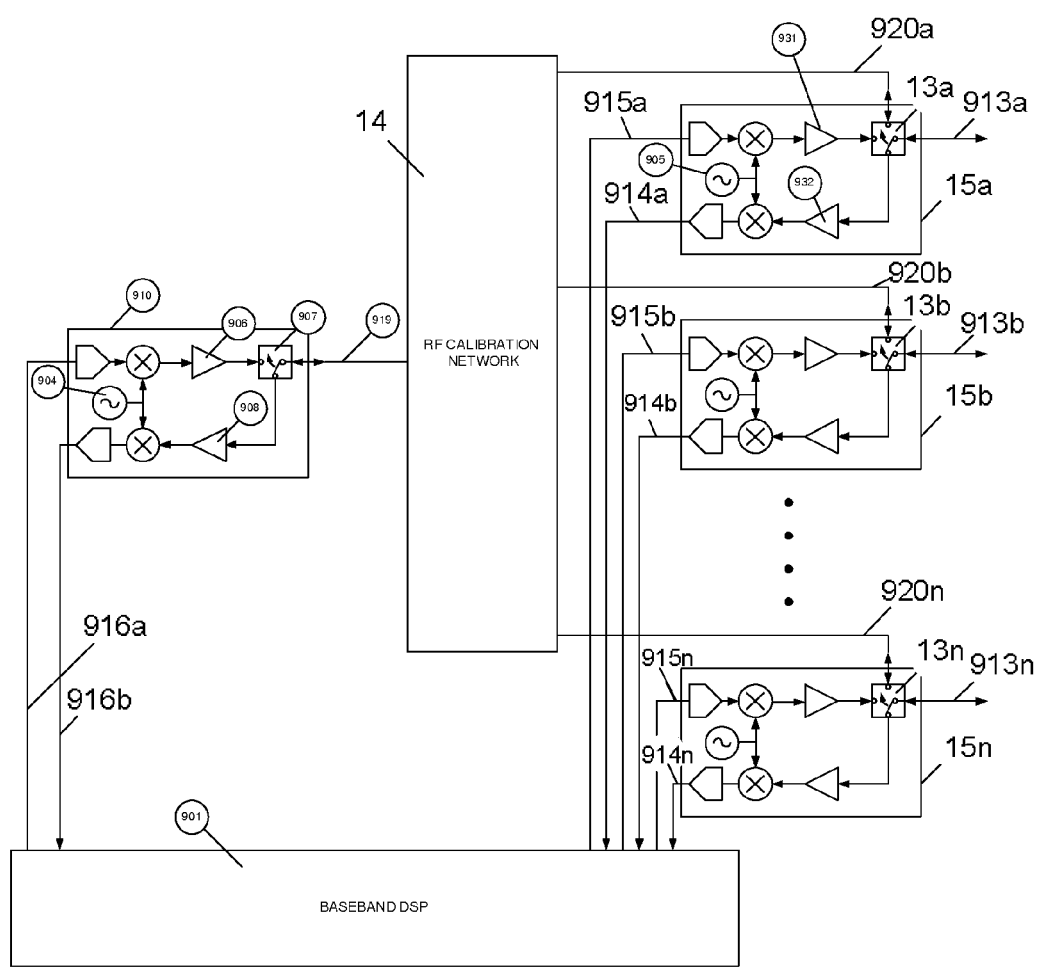
FIG. 9 is a block diagram of an internal self-calibration system of an embedded positioning system in a LAMBACOM unit.

Reference is now made to FIG. 9 which is a block diagram of an internal self-calibration system of the embedded positioning system 32 in the LAMBACOM unit 11. RF transceivers 15a-n, one for each antenna element 12a-n is connected to the antenna elements 12a-n through connections 913a-n, and the data in reception mode is connected to a baseband digital signal processing (DSP) unit 901 through connections 914a-n. In transmission mode the signal from the baseband DSP unit 901 is connected to the RF transceivers through connections 915a-n. In transmit mode, the RF switch 13a is switched in the position where the antenna connector is connected to the transmitter 931. In normal reception operation the RF switch 13a is connected to the receiver 932. In calibration mode the RF switch 13a can be connected between a calibration network feed 920a and the transmitter chain 931 when calibrating the transmission, and to the receiver 932 when calibrating the receiver chain 932. Calibration mode setting may be applied for all RF transceivers 13a-n in the LAMBACOM unit 11, or applied for only one transmitter at a time. In a LAMBACOM unit 11 with a large number of RF transceivers 15a-n, typically above sixteen antenna elements 12a-n, the effect of disabling a single RF transceivers is less than 0.2 dB, and hence internal calibration can be done without interrupting normal transmission and reception operation. A reference transceiver 910 is used together with the RF calibration network 14 and the RF line feeds 920a-n to be connected to the RF transceivers 15a-n. When calibrating the transmitter 931a RF switch 907 in the reference transceiver 910 connects a calibration line 919 to a reference receiver 908 and when calibrating the receiver 932, the RF switch 907 in the reference transceiver 910 connects the calibration line 919 to a reference transmitter 906. By digital connections 913a-n, 914a-n, 915a-n and 916a-b a closed digital signal processing loop is formed. Oscillators 905 in the RF transceivers 15a-n are phase locked to each other and to an oscillator 904 in the reference transceiver 910. The electrical length of the RF calibration network 14 is identical from the RF-switch 907 through connection 919, the RF calibration network 14 and connection 920a to RF-switch 13a, from RF-switch 907 through connection 919, the RF calibration network 14 and connection 920b to RF-switch 13b and from RF-switch 907 through connection 919, the RF calibration network 14 and connection 920n to RF-switch 13n. Since the electrical length in the calibration distributed network is equal for all paths, the variation with respect to operating frequency and temperature variations are eliminated. The calibration network can be used to monitor correct operation of each of the RF transceivers in transmission or reception mode and to alert internal warnings if some of the modules in the RF transceivers should fall outside the normal operation. The calibration network system uses the same code-word transmissions as used for communication between LAMBACOM units 11. The advantages of this method are that transmitter and receiver correlator system resources can be re-used by the calibration system to measure the exact phase-of-arrival, the code-word and correlation suppresses interfering signals that otherwise can increase the phase measurement inaccuracy, the calibration process is very fast when initiated by the communication controller 22. Because of the time synchronous operation of the LAMBACOM units, the calibration process can be executed in a common, synchronous time slot for all LAMBACOM units in the system, and by this method no transmitted data frames is lost because a receiver is in calibration mode. The calibration system also provides information about the operational status in all transceivers that is used for built-in self-test (BIST).

Figure 10:
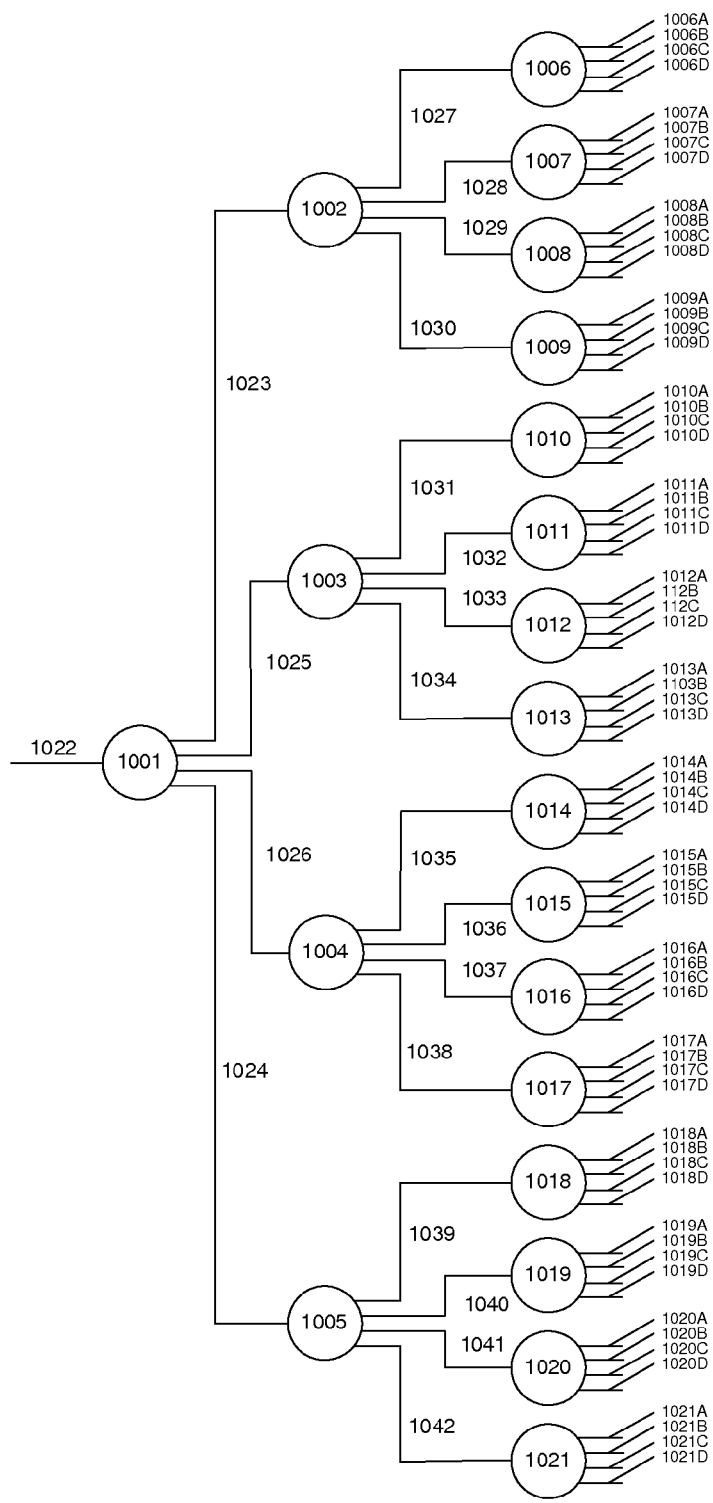
FIG. 10 is a block diagram of an embodiment of an internal calibration network in a LAMBACOM unit.

Reference is now made to FIG. 10 which is a block diagram of an embodiment of the internal calibration network 14 in a LAMBACOM unit 11. The embodiment shown in the block diagram is for a sixty-four element LAMBACOM unit. The network is a bidirectional passive F network that is integrated inside the same printed circuit board (PCB) containing the RF transceivers 15a-n. The signal from the internal reference transceiver 910 is connected through a feed line 1022 to a power splitter 1001 splitting the signal into 1023-1026. The signal is further divided into power splitters 1002, 1003, 1004, 1005 at the second stage, splitting the signal into 1027-1030, 1031-1034, 1035-1038 and 1039-1042, respectively. Power splitters in the range 1006-1021 at the third stage is further splitting the signal for each power splitter into four, i.e. 1006A-1006D, 1007A-1007D, and so on. The electrical length from 1022 to the range 1006A-1021D are all equal. The power level ratios from feed line 1022 to the power splitters in the range 1006A-1021D are all equal.

Figure 11:
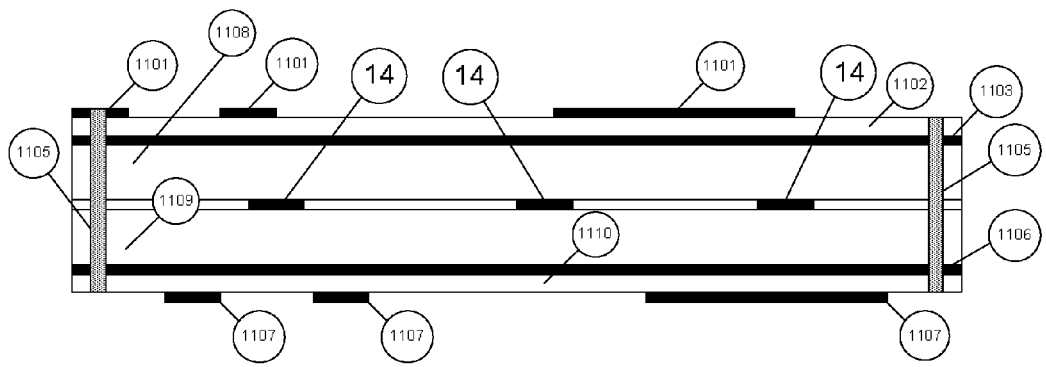
FIG. 11 is an illustrative drawing of a physical cross section of a printed circuit board (PCB) where F transceivers in a LAMBACOM unit are integrated.

Reference is now made to FIG. 11 which is an illustrative drawing of a physical cross section of the printed circuit board (PCB) where the RF transceivers 15a-n in the LAMBACOM unit 11 are integrated. The PCB is a multilayer substrate that in one embodiment is in conventional FR4 material. In this embodiment the number of metallic layers is five. Metallic traces 1101 are located at the top of a substrate. A ground layer 1103 protects the inner layer calibration network 14 from noise from signals on other layers. A ground layer 1106 is placed under the calibration network 14 and together with a large number of via connections 1105 the internal calibration network 14 is encapsulated inside a metallic structure that isolates the internal calibration network 14 electrically from other signals and external electrical fields. A bottom layer 1107 containing circuit patterns, and dielectric materials 1102, 1108, 1109, 1110 isolate the metallic layers in the printed circuit board structure from each other. The dielectric layers 1108 and 1109 have a defined thickness to form a controlled impedance for a given track width in the calibration network 14. In order to reduce the impact from production variations of dielectric layer thickness and etch precision, the thickness of the dielectric layers 1108 and 1109 may be larger than the other dielectric layers 1102 and 1110.

Figure 12:
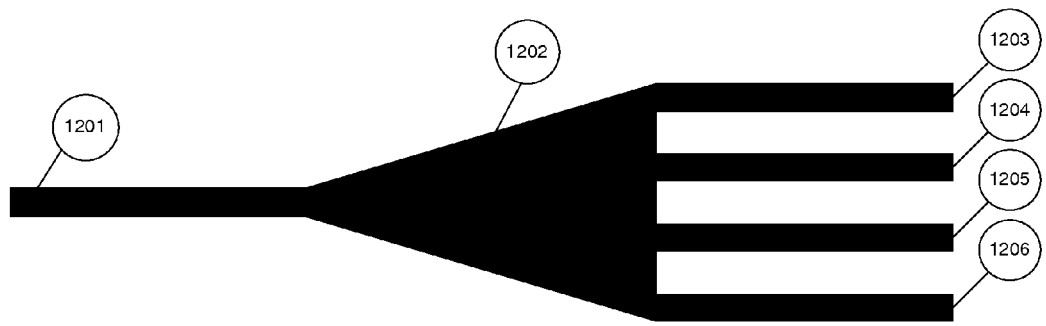
FIG. 12 is an illustrative drawing of a detail of an embodiment of the copper pattern of the internal calibration network.

Reference is now made to FIG. 12 which is an illustrative drawing of a detail of an embodiment of a copper pattern of the internal calibration network 14. The drawing shows the top view of the copper foil pattern of a power splitter applied in 1001-1021. The power splitter is arranged between two ground planes, and hence, is a strip-line structure. A transmission line 1201 is connected to a splitter section 1202, and the power is divided equally at four transmission lines 1203-1206. The electrical length from 1201 to 1203, 1201 to 1204, 1201 to 1205 and 1201 to 1206 is equal. The splitter structure is a broadband structure that allows the electrical length to be equal and the power balance to be maintained over at least 15% bandwidth relative to the operating frequency.

Figure 13:
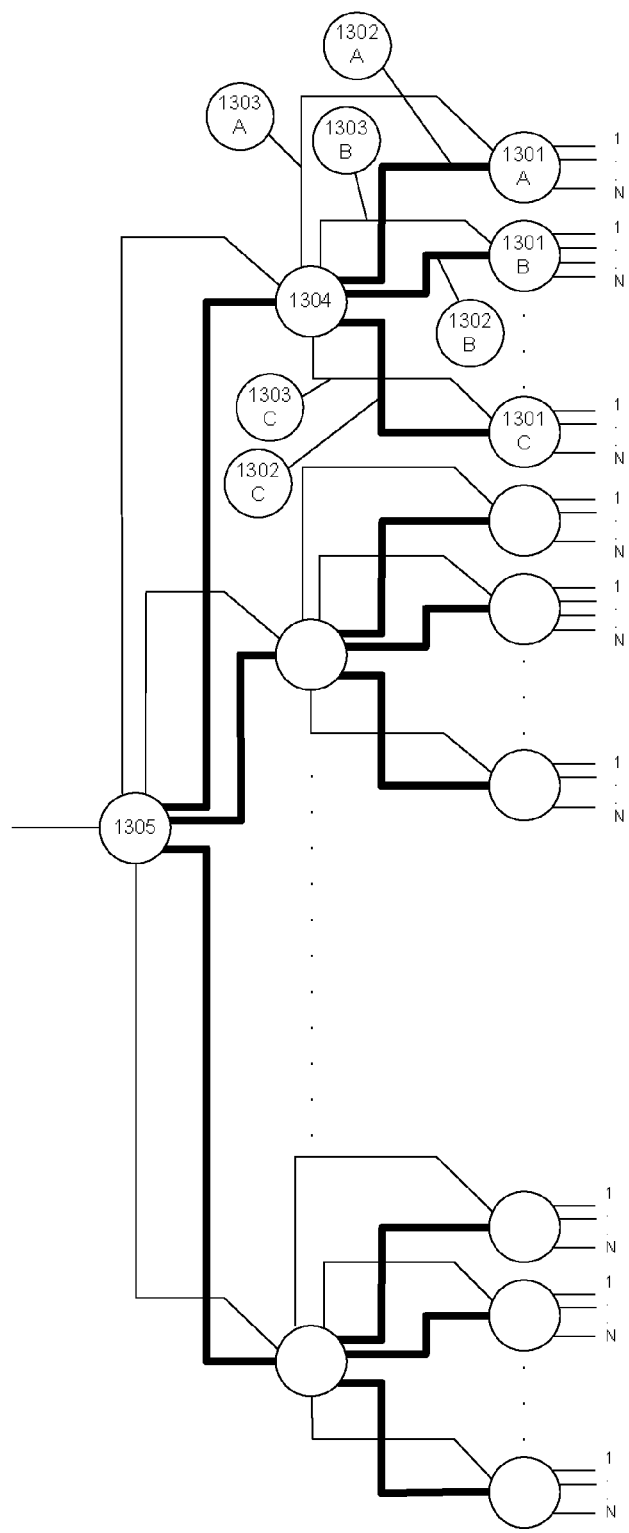
FIG. 13 is an illustrative drawing of high-speed digital streaming bus system architecture according to the present invention.

Reference is now made to FIG. 13 which is an illustrative drawing of the high-speed digital streaming bus system architecture according to the disclosure. In this embodiment, the number of inputs of the concentrators is 4 and the number of concentrator levels is 3. Each radio transceiver 15a-n with digital inputs for TX and outputs for RX are clustered into cells of 1 . . . N transceivers in each cell. The concentrators 1301a-c aggregate traffic to the next level concentrator. A main concentrator 1305 is used to distribute the digital data in a central processing unit. This unit is in one embodiment a FPGA where the data is used for beam-forming, demodulation and positioning. A high-speed data bus 1302a-c forms the connection between the concentrators 1301a-c and a concentrator 1304. The high-speed bus is implemented as a set of independent single-wire serial high-speed data lines with embedded mechanisms for synchronization, error-detection and flow control. The synchronization mechanism in the bus system enables the data delivery to be coherently synchronized to a given system clock accuracy so that the multiple data streams can be processed time-aligned sample by sample. The high-speed bus between the concentrators 1304 and 1305 has a larger number of single-wire lines than the high-speed bus 1302a-c between concentrators 1301a-c and 1304. A low-speed control bus 1303a-c is used between the concentrators as a control bus for high-speed control functions, such as bus calibration, direction control and error control. High-speed bus calibration is a method where the phase of the local system clock in the concentrators are adjusted and calibrated so data in each of the high-speed single wire busses in the concentrators 1301a-c, 1304, 1305 are presented with time aligned eye openings relative to the system clocks. This enables that the common system clock in the concentrators can be used without the need for individual phase adjustments for each single-wire line. If a failure is detected in one of the single wire lines in a high-speed bus, this is detected by the bus control system, and the logical channels that are aggregated into this line are then disabled. This mechanism limits the loss of service if there is a hardware failure on one of the transmission lines in the high-speed bus.

The invention claimed is:

1. A method of setting up a wireless long range communication network between several communication units each having a Long-range Adaptive Mobile Beam-forming Ad-hoc Communication (LAMBACOM) unit (11) including an array Radio Frequency (RF) transceiver section (15), a spatial phase front analysis section (16), a delay section (18), a beam-former section (17), a RF switching section (13), an antenna element section (12), a positioning system (32), a communication controller (22) and a data link (23), comprising the following steps:
   a. performing a frame-by-frame spatial scan for a phase modulated, coherent code-word from other communication units using spatial analysis of signals from the RF-transceiver section (15) through signal processing based on signals received and without requiring prior location of a source of said signals received;
   b. provide beam forming according to a selection of optimum signal to interference ratio via utilizing a digital antenna beam-former (17) with an appropriate coefficient set to optimize signal energy before first received (RX) data are passed through a plurality of delay elements (18a-n) of the delay section (18) for achieving an optimum antenna shape and demodulation of the first received RX data from any direction;
   c. calculating spatial angular direction of each received communication message from another communication unit in the wireless long range communication network;
   d. measuring time-of-arrival between the communication units based on correlation of a code-word that is included in each communication message in the wireless long range communication network;
   e. transmitting a response message to other communication units containing information about time-of-arrival for a decoded message and delay time from the time-of-arrival to the transmission of the response message; and
   f. mutually exchanging position information between all communication units in the wireless long range communication network through the same RF transceiver section (15) that is used for positioning.

2. The method according to claim 1, comprising the step of using a local database with defined areas where transmission restrictions apply to define transmission power limits and frequencies in a sector of transmission.

3. The method according to claim 2, comprising the step of using a digital antenna beam-former for controlling the RF-transceiver section (15) so that emitted power level or frequencies or both around the communication unit are within the transmission restrictions.

4. The method according to claim 1, comprising the step of using positioning angle information from a LAMBACOM unit (11) or combined angle and distance measurements from several LAMBACOM units (11) for updating the position data of a predetermined LAMBACOM unit relative to other LAMBACOM units (11) for navigating mobile units in scenarios where all other navigation systems are unavailable.

5. The method according to claim 1, comprising the step of using information from the positioning system (32) for optimizing range of a communication link.

6. The method according to claim 1, comprising the step of using information from the positioning system (32) to reduce interference to or from other communication units.

7. The method according to claim 1, wherein step (c) includes focusing transmission energy in a sector around an estimated incoming signal when data shall be transmitted back to the other communication unit and updating internal lists of communication unit IDs and incoming directions, and updating distances for each received data frame.

8. The method according to claim 7, comprising the step of using an optimum combination of phases for a received signal to achieve the best signal-to-interference ratio, and using the ratio coefficients to calculate an estimate of the direction of origin of phase front and thereafter creating a phase coefficient set that provides one or several phase front directions where data is sent to the particular communication unit.

9. The method according to claim 1, wherein step (b) includes using a phase coherent modulated code-word as a start for each data frame, the code-word indicating the start of each data frame and being used for exact time and phase synchronization.

10. The method according to claim 9, characterized in that step (b) includes using a phase modulated code-word using a coherent and synchronously rotating code-book with complex modulated phase coded chips.

11. The method according to claim 1, comprising the step of using a tracking feedback/feed-forward method including using modulation data to analyze changes of dispersion, multipath, phase and time-of-arrival through decoding of a long frame for performing propagation channel training constantly without introducing additional link overhead.

12. The method according to claim 1, comprising the step of negotiating between the communication units in the wireless long range communication network for selecting a common time reference and electing a network coordinator that defines a time-slot services in the wireless long range communication network.

13. The method according to claim 12, comprising the step of determining ranges between the communication units, and arranging data transmissions in time slots with a given set of optimum link parameters.

14. The method according to claim 1, comprising the step of using a dedicated calibration network where all physical lengths from a reference transmitter to all antenna elements are equal for eliminating thermal skew in the wireless long range communication network.

15. The method according to claim 1, comprising the step of arranging several LAMBACOM units (11) at the same communication unit for covering of a larger sector and allowing fast handover in an ad-hoc network structure.

16. A system for setting up a wireless long range communication network between several communication units, comprising:
   a Long-range Adaptive Mobile Beam-forming Ad-hoc Communication (LAMBACOM) unit (11) including an array Radio Frequency (RF) transceiver section (15), a spatial phase front analysis section (16), a delay section (18), a beam-former section (17), a RF switch section (13), an antenna element section (12) including a plurality of antenna elements (12a-n), a positioning system (32), a communication controller (22) and a data link (23), arranged to the communication units, characterized in that:
   the communication controller (22) is configured for
      frame-by-frame spatial analysis of signals from the RF-transceiver section (15) for determining time-of-flight between respective communication units and the direction of a communication unit relative to other communication units through signal processing based on signals received and without requiring prior location of a source of said signals received,
      providing beam-forming according to a selection of optimum signal-to-interference ratio by providing a digital antenna beam-former (17) with an appropriate coefficient set to optimize signal energy before first RX data are passed through a plurality of delay elements (18a-n) of the delay section (18) for achieving an optimum antenna shape and demodulation of the first received RX data from any direction, and
      using angular beam-forming information to provide a low latency positioning information for navigation purposes.

17. The system according to claim 16, comprising a database (31) containing information of transmission restrictions for local transmission power limits and frequencies for defined geographic areas.

18. The system according to claim 16, wherein the antenna elements (12a-n) are spread over a physical area, and that each antenna element (12a-n) is phase coherent with the other antenna elements (12a-n).

19. The system according to claim 16, wherein the RF-transceiver section (12) includes at least four adaptive antenna elements (12a-n).

20. The system according to claim 16, comprising a modulator/demodulator unit (20) arranged for constant envelope modulation with no amplitude components.

21. The system according to claim 16, wherein the digital antenna beam-former (17) is configured for controlling the antenna elements (12a-n) so that emitted power level or frequencies or both in defined areas around the communication unit are within the transmission restrictions.

22. The system according to claim 16, comprising a plurality of LAMBACOM units (11) arranged to each communication unit, wherein the system is configured for utilizing positioning information as a guiding system for movable communication units, for positioning each communication unit relative to other communication units in real time.

23. The system according to claim 16, configured for using positioning information from the positioning system (32) to perform one or more of:
   i. optimizing range of a communication link;
   ii. reducing interference to or from other communication units, and
   iii. providing a tracking system for a mobile communication unit with a high frequency of position updates.

24. The system according to claim 16, comprising one or more additional sensors selected from the group consisting of an accelerometer (27), gyroscope (29), magnetometer (28), altitude determining unit (30) and Geographical Positioning sensors (26), for increasing positioning accuracy and increasing redundancy of the system.

25. The system according to claim 16, configured for providing a local time reference for use by the communication controller (22) to generate a common high precision clock reference signal and lock all F transceivers (15a-n) to this time reference.

26. The system according to claim 16, comprising a time-domain correlator (802) and a coherent local oscillator (905), the correlator (802) being arranged for determining the start of a data frame by correlating a pre-defined long code-word and determining the exact time-of-arrival and phase of the coherent local oscillator (905).

27. The system according to claim 16, comprising at least one adaptive filter (804) for increasing the signal-to-noise-ratio and reducing interference to or from other communication units and inter-symbol interference.

28. The system according to claim 16, comprising a dedicated calibration network (14) integrated into a printed circuit board where all physical lengths from a reference transmitter (910) to all antenna elements (12a-n) are substantially equal, thereby eliminating thermal skew in the wireless long range communication network.

29. A method of setting up a wireless long range communication network between several communication units each having a Long-range Adaptive Mobile Beam-forming Ad-hoc Communication (LAMBACOM) unit (11) including an array Radio Frequency (RF) transceiver section (15), a spatial phase front analysis section (16), a delay section (18), a beam-former section (17), a RF switching section (13), an antenna element section (12), a positioning system (32), a communication controller (22) and a data link (23), comprising the following steps:
   a. performing a frame-by-frame spatial scan for a phase modulated, coherent code-word from other communication units using spatial analysis of signals from the RF-transceiver section (15) through signal processing based on signals received and without requiring prior location of a source of said signals received;

b. determining an optimum direction from the code-word before settings are applied to a complete decoding of a frame and updating beam forming for each received code-word;
c. calculating spatial angular direction of each received communication message from another communication unit in the wireless long range communication network;
d. measuring time-of-arrival between the communication units based on correlation of a code-word that is included in each communication message in the wireless long range communication network;
e. transmitting a response message to other communication units containing information about time-of-arrival for a decoded message and delay time from the time-of-arrival to the transmission of the response message; and
f. mutually exchanging position information between all communication units in the wireless long range communication network through the same RF transceiver section (15) that is used for positioning.

* * * * *